United States Patent [19]

Komatsu et al.

[11] Patent Number: 5,024,088
[45] Date of Patent: Jun. 18, 1991

[54] ELECTROMAGNETIC ACCELEROMETER

[75] Inventors: Fumito Komatsu; Hideo Usuki; Yuzo Oguchi, all of Nagano, Japan

[73] Assignee: K.K. Sankto Seiki Seisakusho, Nagano, Japan

[21] Appl. No.: 368,622

[22] Filed: Jun. 20, 1989

[30] Foreign Application Priority Data

Jun. 20, 1988 [JP] Japan .................. 63-151582

[51] Int. Cl.$^5$ .............................................. G01P 15/13
[52] U.S. Cl. .................................................. 73/517 B
[58] Field of Search .............. 73/517 R, 517 B, 516 R

[56] References Cited

U.S. PATENT DOCUMENTS

| 2,695,165 | 11/1954 | Hansen | 73/517 B |
| 3,262,325 | 7/1966 | Senstad | 73/517 B |
| 3,508,445 | 4/1970 | Penney et al. | 73/517 B |
| 4,077,132 | 3/1978 | ERickson | 73/517 R |
| 4,344,235 | 8/1982 | Flanders | 73/517 B |

FOREIGN PATENT DOCUMENTS 807193 1/1959 United Kingdom .............. 73/517 B

OTHER PUBLICATIONS

T. L. Foldvari et al., "Capacitive Transducers", *Instruments & Control Systems*, Nov. 1964, pp. 77-85.

*Primary Examiner*—John E. Chapman
*Attorney, Agent, or Firm*—Sughrue, Mion, Zinn, Macpeak & Seas

[57] ABSTRACT

An accelerometer for detecting acceleration includes a support, a detection body movable relative to the support upon application of acceleration, a plurality of electromagnets for keeping the detection body floating in the support so that the electromagnets are out of contact with the detection body, a detector for detecting the position of the detection body relative to the support, and a computing section for computing the magnitude and direction of the acceleration exerted upon the detection body according to the detection signal from the detection means. The accelerometer also includes a feedback control section for feeding back the output signal from the computing section to the coils of the electromagnets to control application of current to the coils thereby allowing the detection body to be kept floating at a predetermined position relative to the support.

7 Claims, 4 Drawing Sheets

ELECTROMAGNETIC ACCELEROMETER

BACKGROUND OF THE INVENTION

The present invention relates to an accelerometer capable of detecting small amounts of acceleration for all directions.

There has been known an accelerometer of a type in which the displacement of a pendulum caused by acceleration is adjusted back to its null position by a counterbalancing force exerted by the electrical spring of a servo mechanism, with the resultant feedback current being used to detect the applied acceleration. A problem with this type of accelerometer is that it is capable of detecting the displacement of the pendulum only in one direction so that in order to detect acceleration for all directions, a complex system including at least three units of accelerometer must be used.

A single unit of accelerometer, that is, designed to detect acceleration for all directions has been proposed in JP-A-59-5965 (the term "JPA" as used herein means an "unexamined published Japanese patent application"). In this accelerometer, the measurable force developed by a processing gyroscope is used. The device consists of an inner gimbal with a rapidly rotating off-balance mass and an outer gimbal in which the inner gimbal is mounted. Acceleration is measured by detecting the resulting movement of the outer gimbal relative to the inner gimbal.

Also known is an accelerometer of a type in which a magnet on a cylinder is fixed to a seismic mass, with another magnet being positioned inside the first magnet. acceleration is measured by detecting the resulting movement of the inner magnet relative to the outer magnet. An accelerometer of this type is described in JP-B-54-6226 (the term "JP-B" as used herein means an "examined Japanese patent publication").

A single unit of the accelerometer described in JP-A-59-5965 suffices for detecting acceleration for all directions but because of the friction between inner and outer gimbals, this device is not suitable for detecting small amounts of acceleration.

An accelerometer using the operating principle described in JP-B-54-6226 would be capable of frictionless support of the probe (or detection body) and hence has the potential to be used for detecting small amounts of acceleration. However, this accelerometer is not adapted for practical applications since the position of the probe is not subject to feedback control. In addition, precise detection of acceleration is impossible since the probe which might be displaced by gravity or some other disturbing factors cannot be adjusted to a predetermined position by feedback control.

SUMMARY OF THE INVENTION

An object of the present invention is to provide an accelerometer that is free from the aforementioned problems with the prior art and which is capable of detecting small amounts of acceleration for all directions in spite of its simple construction.

This object of the present invention can be attained by an accelerometer which comprises a probe (or a detection body) that moves relative to a support upon exertion of acceleration, electromagnets for holding the probe floating above the support, detection means for detecting the position of said probe, and a computing section for computing the magnitude and direction of the acceleration exerted upon the probe based on the results of detection with said detecting means.

In the accelerometer of the present invention, the probe (or detection body) is always held floating above the support by means of the electromagnets. When acceleration is exerted, the probe moves relative to the support and its movement is sensed by the detection means. The exerted acceleration is detected by the computing section which performs arithmetic operations on the results of detection with said detecting means. If feedback control is performed on the electromagnets based on the results of detection with the detecting means, the probe can be held at a predetermined position relative to the support.

DETAILED DESCRIPTION OF THE PREFERRED EMBODIMENTS

An accelerometer according to an embodiment of the present invention will be described hereinafter with reference to the accompanying drawings.

Figure 1:
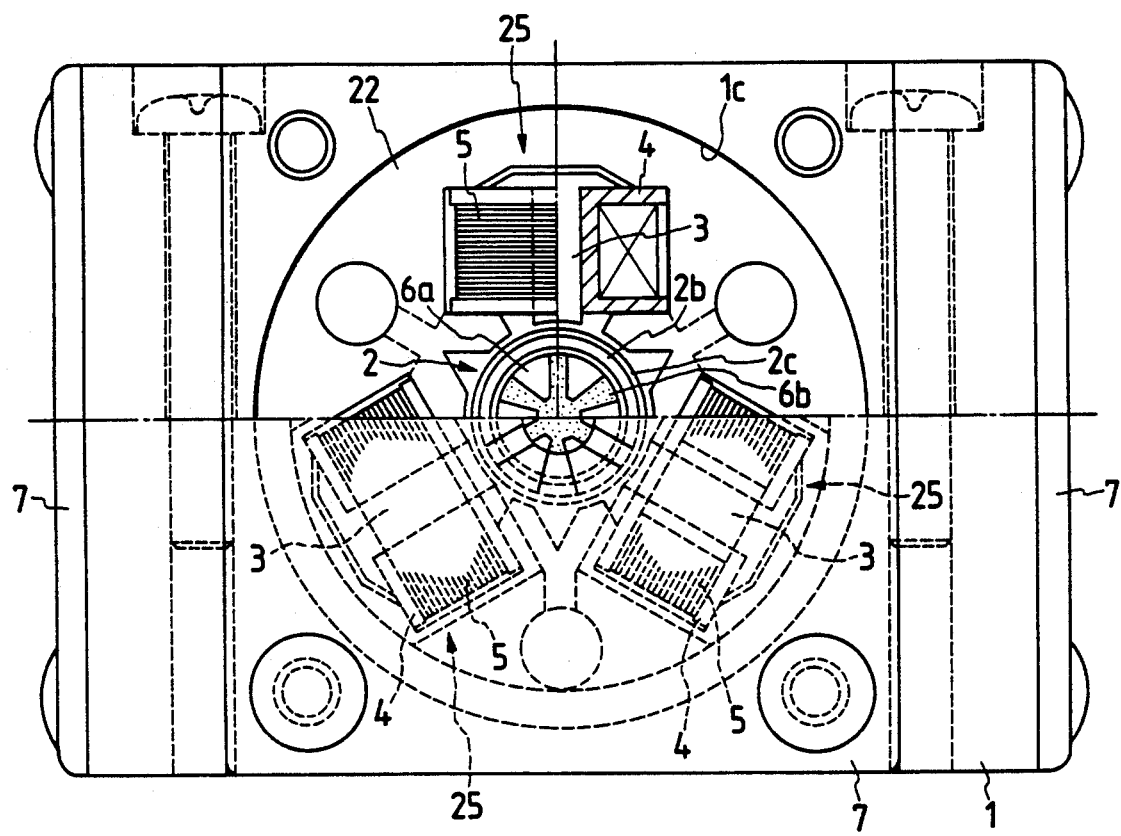
FIG. 1 is a front view showing an accelerometer according to an embodiment of the present invention.
Figure 2:
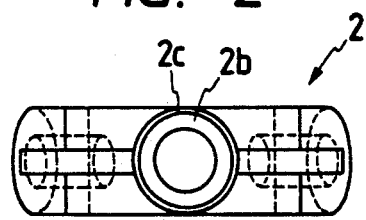
FIG. 2 is a front view of the probe in the accelerometer shown in FIG. 1.
Figure 3:
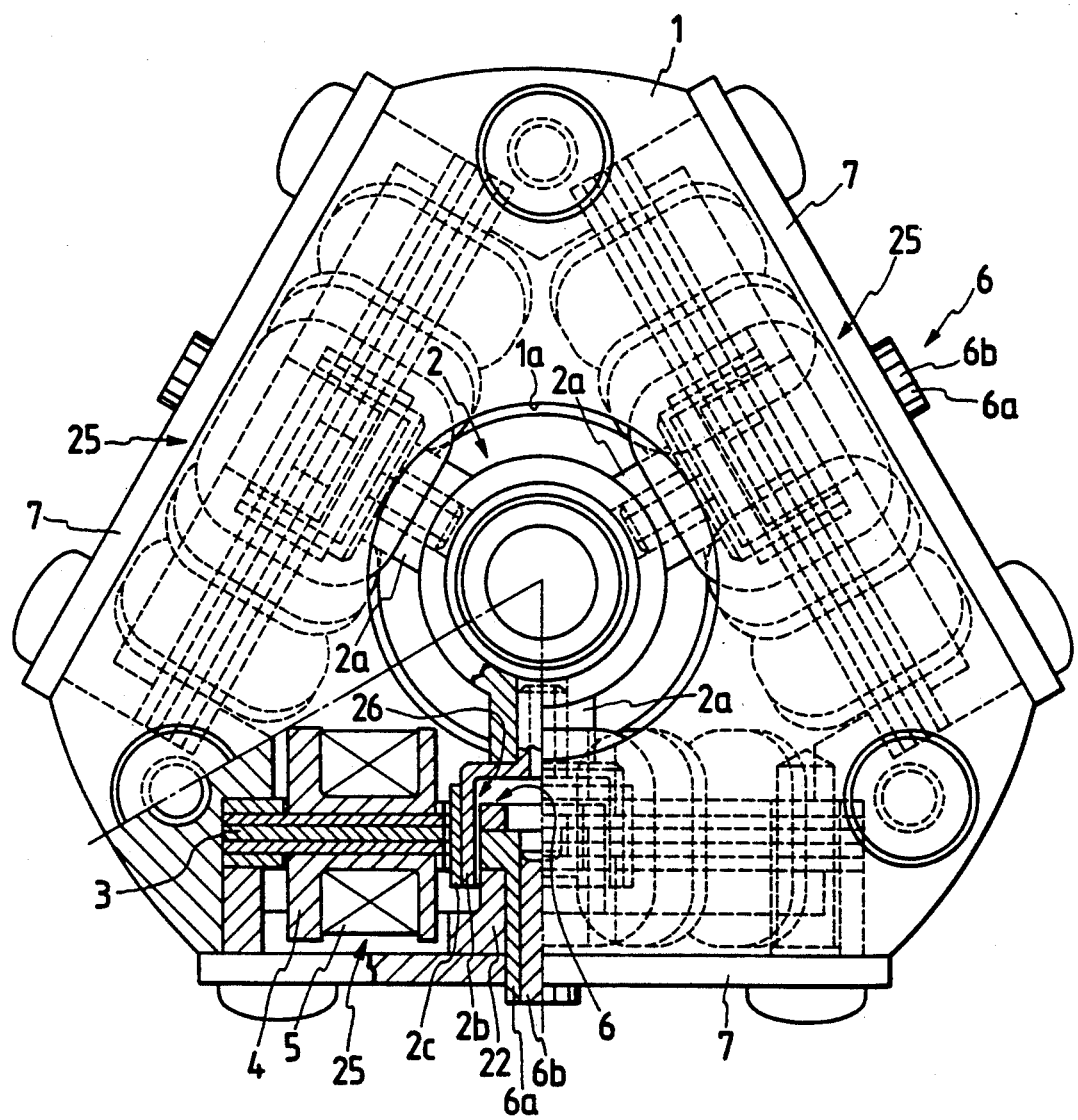
FIG. 3 is a plan view of the accelerometer shown in FIG. 1.

Referring to FIGS. 1 to 3, a metallic support 1 serves as the main body of the accelerometer, which is composed of an upper and a lower member that are secured by screwing. The support 1 is generally in the form of a triangular prism with a circular concavity 1c being formed in each of the three lateral sides. A set of three electromagnets 25 are embedded in each of these concavities along the lateral sides in which they are formed. Hence, a total of nine electromagnets 25 are used in the accelerometer. The three electromagnets 25 in each set are disposed on each face of the support 1 at intervals of 120 degrees around the common center a shown in FIG. 1. Each electromagnet 25 consists of an iron core 3 that is formed of laminated magnetic sheets and which is fixed to the support 1, a bobbin 4 fitted around this iron core 3, and a coil 5 wound around the bobbin 4.

A cylindrical hole 1a penetrating through the vertical axis of the support 1 is formed in the center of its cross section. A probe (or detection body) 2 for detecting acceleration is disposed within this hole 1a. The probe 2 (or detection body) has an annular base that is loosely fitted in the hole 1a, with a predetermined gap being formed between the outer surface of the annular base and the inner surface of the hole 1a, and arms 2a extending radially from the base at intervals of 120 degrees. The annular base is formed of a nonmagnetic material such as a synthetic resin, and the remote end of each arm 2a is fitted with an aluminum ring 2b. An iron ring 2c made of magnetic material is fitted around the aluminum ring 2b.

Figure 4:
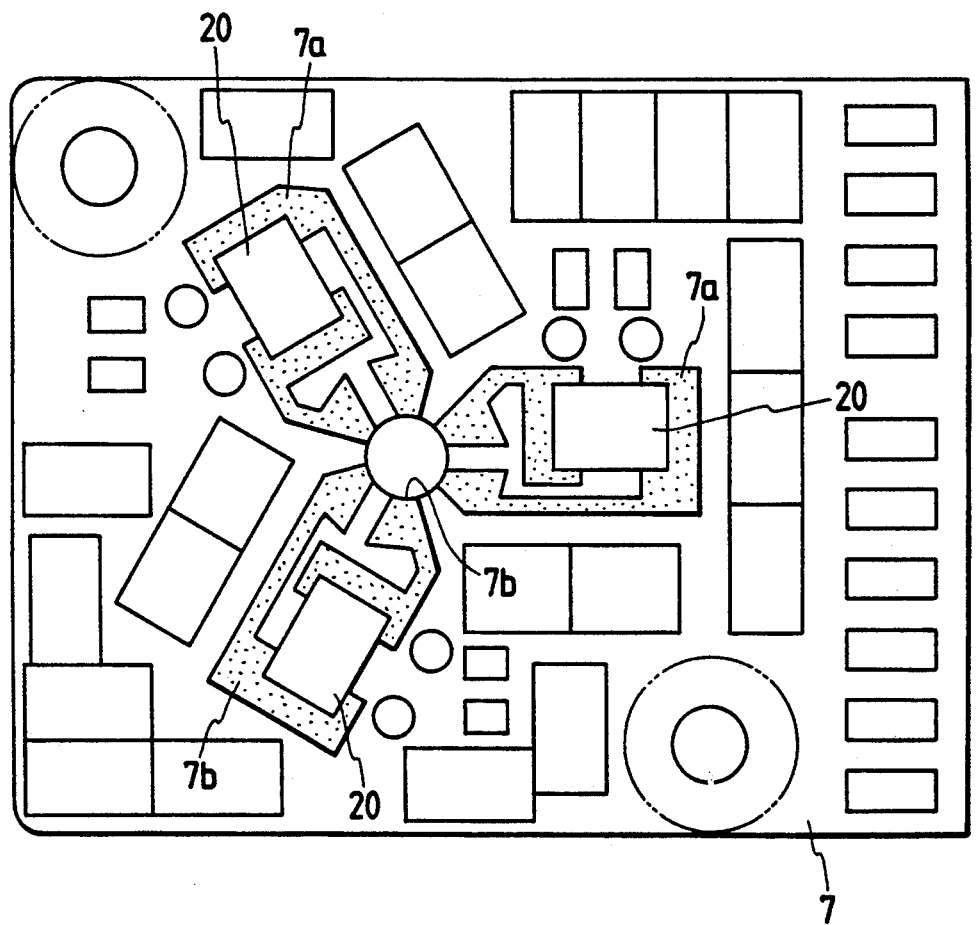
FIG. 4 is a front view of the printed-circuit board in the accelerometer shown in FIG. 1.

A disk-shaped insulation board 22 is fitted in the circular concavity 1c which is formed in each of the three lateral sides of the support 1. Each insulating board 22 is provided with a relief window for the coil bobbin 4. The insulating board 22 also has a dielectric projection 6 fixed to its central portion. Each dielectric projection 6 consists of six conductors 6a and six insulators 6b which are arranged alternately in the circumferential direction to form a cylindrical body. The opposite ends of each dielectric projection 6 protrude on the front and back sides of the insulating board 22. The end of each dielectric projection 6 which protrudes on the back side of the insulation board 22 is fitted into the aluminum ring 2b at the remote end of each arm 2a of the probe 2, with a predetermined gap 26 provided between the outer peripheral surface of the end of each dielectric projection 6 and the inner peripheral surface of the ring 2b. The aluminum ring 2b and the conductor 6a which is one component of each dielectric projection 6 provide electrodes for a capacitor 28 (see FIG. 5) which serves as detection means for sensing the position of the probe 2. As the gap 26 between the ring 2b and the conductor 6a changes, so does the capacitance of the capacitor 28. A printed circuit board 7 is fixed in superposition on the outer surface of each insulating board 22. As shown in FIG. 4, the printed-circuit board 7 is provided with a relief hole 7b for the dielectric projections 6, as well as a plurality of printed conductor patterns 7a each having one end thereof which converges around the relief hole 7b. The one end of each printed conductor pattern 7a is soldered to the associated conductor 6a of the dielectric projection 6. An inductor (coil) 20 is connected between the other end of a printed conductor pattern 7a and the other end of another conductor pattern 7a which is paired with the first-mentioned conductor pattern. The inductor 20 combines with the capacitor 28 to form a resonant circuit 8 which is shown in FIG. 5.

A set of three electromagnets 25 is disposed along each lateral side of the support 1 in such a way that an extreme end surface of each iron core 3 thereof faces, with a predetermined gap, the outer peripheral surface of the iron ring 2c at the remote end of one of the arms 2a in the probe 2. Each of the electromagnets 25 is controlled with a control circuit to be described hereinafter. The forces of attraction generated from the three electromagnets 25 are balanced with each other, whereby the iron core 3 and the iron ring 2c are held apart by a predetermined distance, thus permitting the entire portion of the probe 2 to float apart from the support 1.

Figure 5:
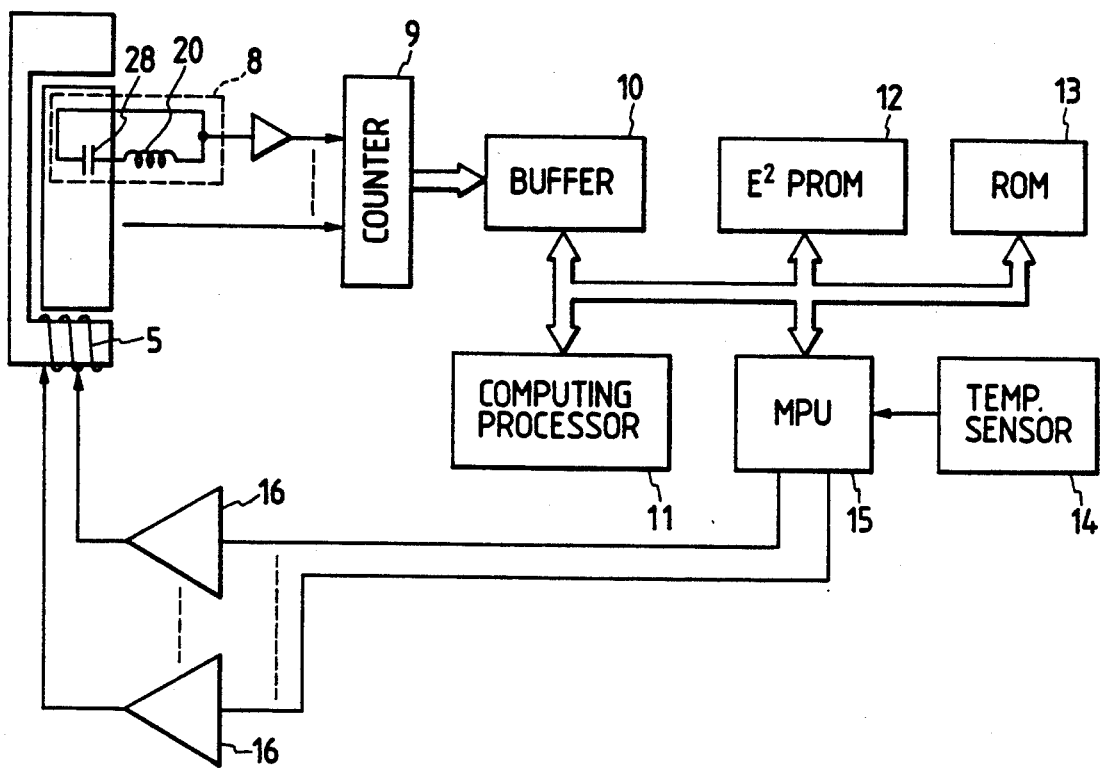
FIG. 5 is a circuit diagram showing a detector circuit which is applicable to the present invention.

Referring to FIG. 5, the oscillating outputs of the resonant circuits 8 are directly sampled by a counter 9. The result of counting is sent to a buffer 10 for temporary storage and thence forwarded to a computing processor 11 for arithmetic processing. Programmed in an E²PROM 12 is resonant frequency information associated with the probe 2 floating at the central position, and information about offsetting due to such factors as temperature and humidity variations. A program for computing in the processor 11 is written in ROM 13. The results of computation by the processor 11, the data from a temperature sensor 14 and the data from the E²PROM 12 are compared with one another in an MPU 15 and the application of current to the respective electromagnets 25 is switched based on the results of comparison. Shown by numeral reference 16 in FIG. 5 is a driver for driving the coil on each electromagnet 25 on the basis of the results of comparison made by the MPU 15.

The operation of the accelerometer according to the embodiment described above will be described.

In the absence of applied acceleration, the force of attraction generated between each iron ring 2c and each iron core 3 is balanced with one another so as to hold the probe 2 floating above the support 1. The position of the probe 2 is constantly checked by a detector circuit including the resonant circuits 8, the counter 9, the buffer 10, the computing processor 11, etc. If the balance described above is upset, in response to a detection signal from the detector circuit, a feedback signal is applied from the MPU 15 to the coil 5 on each electromagnet 25 through each driver 16, thereby allowing the probe 2 to be held floating above the support 1 at a predetermined relative position.

If acceleration is exerted, the probe 2 will maintain its position by inertia, so that the distance 26 between the aluminum ring 2b and each conductor 6a on the dielectric projection 6 will decrease for one set of aluminum ring and conductor and increase for another set. Since each of the three capacitors 28 is composed of the aluminum ring 2b and the conductor 6a, the capacitance of one capacitor will increase whereas the capacitance of another will decrease. This change in the capacitance of each capacitor 28 will cause a corresponding change in the resonant frequencies of the resonant circuits 8 shown in FIG. 5, which change may be detected by counting with the counter 9. Three capacitors 28 are provided on each lateral side of the support 1, so a total of nine capacitors are formed on the support 1. When the changes in the capacitance of these nine capacitors 28 are detected, the result of detection is subjected to arithmetic operations in the computing processor 11 so as to detect the magnitude and direction of the applied acceleration. By controlling the current being applied to the coils 5 on the electromagnets 25 in accordance with the detected magnitude and direction of acceleration, the magnetism from the respective electromagnets 25 is controlled in each direction, thereby allowing the probe 2 to be held floating above the support 1 at a predetermined central position.

Figure 6:
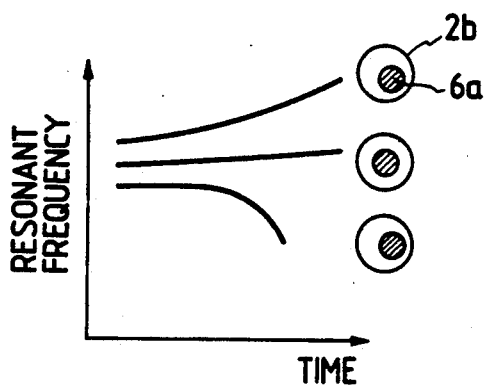
FIG. 6 is a graph showing the profile of oscillating frequencies generated from the detector circuit of FIG. 5.
Figure 7:
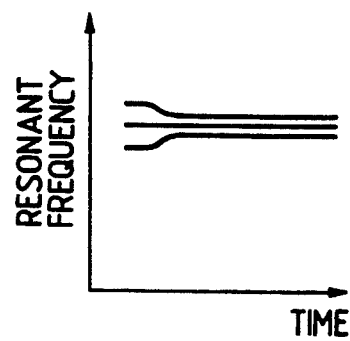
FIG. 7 is a graph showing another profile of oscillating frequencies generated from the detector circuit of FIG. 5.

FIG. 6 shows the profiles of resonant frequency vs time of the resonant circuits 8 which were brought out of balance as a result of relative movement of the probe 2. FIG. 7 shows the profiles which are rebalanced by feedback control. When the probe 2 is displaced relative to the support 1, the distance between aluminum ring 2b and conductor 6a will partially vary and the resonant frequency of resonant circuits 8 will fluctuate between capacitors 28 each consisting of an aluminum ring 2b and each conductor 6a. Thus, by controlling the drive current to the respective coils 5 in such a way that the resonant frequencies generated from the resonant circuits 8 will become substantially equal, the probe 2 can be held floating above the support 1 at a predetermined central position.

As described above, the probe 2 of the accelerometer according to the embodiment under consideration is always held floating above the support 1, so that the response of the probe to applied acceleration is quick enough to allow the accelerometer to operate with high sensitivity. In addition, each lateral side of the support 1 in a triangular prism form is provided with detection means which is capable of sensing the position of the probe 2 in three directions so that acceleration can be detected for all directions and the device is fairly simple in configuration. In order to keep the probe 2 floating in the support 1, the electromagnets 25 are used and the current being applied to these electromagnets is controlled by feeding back the positional information about the probe 2. This enables the probe 2 to be securely held floating and precise acceleration measurement can be accomplished without being influenced by gravity or other disturbing factors.

If desired, the probe 2 may have four arms that are spaced at intervals of 90 degrees. In this case, the number of electromagnets is also increased to four. In the embodiment illustrated in the accompanying drawings, the probe 2 is so designed as to be held floating by the forces of attraction between the probe 2 and the electromagnets 25. Alternatively, the surrounding of the iron rings 2c may be magnetized for the same polarity as that of the iron cores 3 on the electromagnets 25, so that the probe 2 will float by the resulting forces of repulsion. If the iron rings 2c are magnetized as described above, a device sensitive to magnetism such as a Hall-effect device or a magnetoresistor may be used as detection means that senses the change in magnetic field and acceleration is detected or feedback control is performed on the electromagnets in response to a detection signal from the deteciton means.

As is apparent on the foregoing description, the accelerometer of the present invention keeps the probe constantly floating above the support, so that the response of the probe to applied acceleration is quick enough to allow the accelerometer to perform with high sensitivity. In addition, electromagnets are used to keep the probe floating and the positional information about the probe is fed back to control the application of current to the electromagnets. This enables the probe to be securely held floating and precise acceleration measurement can be accomplished without being influenced by gravity or other disturbances.

What is claimed is:

1. An accelerometer for detecting acceleration, comprising:
   support means serving as a main support body for said accelerometer;
   detection body means provided in and movable relative to said support means upon application of acceleration;
   three electromagnet units, each comprising three electromagnets spaced at angles of 120 degrees in a plane, for causing said detection body means to float above said support means, said electromagnet units being combined in the form of a triangular prism;
   detection means for detecting the position of said detection body means relative to said support means to generate a detection signal; and
   computing means for computing the magnitude and direction of the acceleration exerted upon said detection body means according to said detection signal from said detection means.

2. An accelerometer as claimed in claim 1, wherein said detection means includes a capacitor disposed between said support means and said detection body means and a capacity detector for detecting capacity in said capacitor.

3. An accelerometer as claimed in claim 2, wherein said capacity detector includes a resonant circuit having said capacitor.

4. An accelerometer for detecting acceleration, comprising:
   support means serving as a main support body for an accelerometer;
   detection body means provided in and movable relative to said support means upon application of acceleration;
   a plurality of electromagnets for keeping said detection body means floating in said support means, said electromagnets being out of contact with said detection body means;
   detection means for detecting the position of said detection body means relative to said support means to generate a detection signal; and
   computing means for computing the magnitude and direction of the acceleration exerted upon said detection body means according to said detection signal from said detection means;
   wherein said detection means includes a capacitor disposed between said support means and said detection body means and a capacity detector for detecting the capacity of said capacitor; and
   wherein said capacitor includes an aluminum ring disposed on each of at least three portions of said detection body means and a dielectric projection including a conductor provided in said support means, said dielectric projection facing each said aluminum ring with a predetermined gap therebetween.

5. An accelerometer as claimed in claim 4, further comprising magnetic rings fitted around each of said aluminum rings and wherein said electromagnets are provided with cores which face said magnetic rings with a predetermined gap.

6. An accelerometer for detecting acceleration, comprising:
   support means serving as a main support body for said accelerometer;
   detection body means provided in and movable relative to said support means upon application of acceleration;
   a plurality of electromagnets having coils for keeping said detection body means floating in said support means, said electromagnets being out of contact with said detection body means;
   detection means for detecting the position of said detection body means relative to said support means to generate a detection signal;
   computing means for computing the magnitude and direction of the acceleration exerted upon said detection body means according to said detection signal from said detection means to generate an output signal; and
   feedback control means for feeding back the output signal from said computing means to said coils of said electromagnets to control application of current to said coils thereby allowing said detection body means to be kept floating at a predetermined position relative to said support means;
   wherein said detection means includes a capacitor disposed between said support means and said detection body means and a capacity detector for detecting the capacity of said capacitor; and
   wherein said capacitor includes an aluminum ring disposed on each of at least three portions of said detection body means and a dielectric projection including a conductor provided in said support means, said dielectric projection facing each said aluminum ring with a predetermined gap therebetween.

7. An accelerometer as claimed in claim 6, further comprising magnetic rings fitted around each of said aluminum rings, and wherein said electromagnets are provided with cores which face said magnetic rings with a predetermined gap.

* * * * *